United States Patent
Bouti et al.

(10) Patent No.: US 8,100,689 B2
(45) Date of Patent: Jan. 24, 2012

(54) SAFETY CONNECTOR FOR HOT RUNNER, HAVING LATCH RELEASABLY INTERLOCKING VALVE STEM WITH ACTUATION PLATE

(75) Inventors: Abdeslam Bouti, Swanton, VT (US); Thomas Andrew Lawrence, Burlington, VT (US); Stephen Linwood Gray, Cambridge, VT (US); Sohail Mohammed, Colchester, VT (US); Edward Joseph Jenko, Essex, VT (US)

(73) Assignee: Husky Injection Molding Systems Ltd., Bolton, Ont (CA)

( * ) Notice: Subject to any disclaimer, the term of this patent is extended or adjusted under 35 U.S.C. 154(b) by 26 days.

(21) Appl. No.: 12/884,404

(22) Filed: Sep. 17, 2010

(65) Prior Publication Data

US 2011/0086121 A1    Apr. 14, 2011

Related U.S. Application Data

(60) Provisional application No. 61/250,214, filed on Oct. 9, 2009.

(51) Int. Cl.
*B29C 45/22* (2006.01)

(52) U.S. Cl. .................. 425/564; 264/328.9; 425/566

(58) Field of Classification Search .................. 425/562, 425/563, 564, 565, 566; 264/328.9
See application file for complete search history.

(56) References Cited

U.S. PATENT DOCUMENTS

| | | |
|---|---|---|
| 5,078,589 A | 1/1992 | Osuna-Diaz |
| 6,056,535 A | 5/2000 | Shimizu |
| 6,276,916 B1 | 8/2001 | Schad et al. |
| 6,315,543 B1 | 11/2001 | Lausenhammer et al. |
| 6,755,641 B1 | 6/2004 | Nakanishi |
| 7,131,834 B2 | 11/2006 | Babin et al. |
| 7,250,130 B2 | 7/2007 | Weinmann et al. |
| 7,722,351 B2 * | 5/2010 | Feick et al. .................. 425/564 |
| 2010/0092588 A1 | 4/2010 | Tabassi |

FOREIGN PATENT DOCUMENTS

WO        2006042960        4/2006

* cited by examiner

*Primary Examiner* — Timothy Heitbrink (57) ABSTRACT

Disclosed is a safety connector for a hot runner having a valve stem and an actuation plate, the safety connector including: (i) a latch releasably interlocking the valve stem with the actuation plate so that in response to movement of the actuation plate, the valve stem becomes movable; and (ii) a latch mover being cooperative with the latch, and the latch mover being configured to move the latch responsive to a predetermined force acting on the valve stem so that so that the valve stem is released from the actuation plate.

19 Claims, 9 Drawing Sheets

SAFETY CONNECTOR FOR HOT RUNNER, HAVING LATCH RELEASABLY INTERLOCKING VALVE STEM WITH ACTUATION PLATE

CROSS-REFERENCE TO RELATED PATENT APPLICATION(S)

This patent application is a non-provisional application of prior U.S. Patent Application No. 61/250,214, filed Oct. 9, 2009. This patent application also claims the benefit and priority date of prior U.S. Patent Application No. 61/250,214, filed Oct. 9, 2009.

TECHNICAL FIELD

The present invention generally relates to molding systems, and more specifically the present invention relates to: (i) a safety connector releasably interlocking a valve stem with an actuation plate, and/or (ii) a hot runner including the safety connector, and/or (iii) a molding system having the hot runner including the safety connector.

BACKGROUND

U.S. Pat. No. 5,078,589 (Inventor: OSUNA-DIAZ; Publication Date: Jan. 7, 1992) discloses an arrangement for independently controlling shutoff and flow to a cavity gate in a multi-cavity injection mold apparatus. A plurality of valve pins are mounted to a movable holder plate. Each of the valve pins is aligned with a cavity gate and is movable thereinto to control shutoff. A plurality of fixed-position plunger sleeves are: (i) each mounted over a respective valve pin, and (ii) adjustably positioned with respect to a restriction feature in a supply passage upstream of the associated gate.

U.S. Pat. No. 6,056,535 (Inventor: SHIMIZU; Publication Date: May 2, 2000) discloses an injection molding machine including a processing pin provided in a fixed mold side. A movable member is arranged in a space between a fixed mold and a fixed plate. The processing pin can be moved forward and backward together with the movable member with a rear-end portion thereof fixed to the movable member. An end portion of the processing pin is inserted into a mold plate so that it can go in and out of a gate or a cavity by a forward movement and a backward movement of the movable member, which is moved by a drive unit. The above construction may eliminate positional limitation due to a position of a projecting pin in a conventional injection molding machine.

U.S. Pat. No. 6,276,916 (Inventor: SCHAD et al.; Publication Date: Aug. 21, 2001) discloses a failsafe device or a pressure relief mechanism, for a shooting pot actuator in an injection molding machine. The shooting pot actuator has multiple pusher rods mounted on a plate. The plate holds the multiple pusher rods. Moving the plate depresses injection pistons of the shooting pot and injects molten material into a number of mold cavities. To avoid damage to the machine from the pusher rods for the case where an injection piston seizes, the failsafe device is used to mount the pusher rods to the plates. A shearing member is interposed, or sandwiched, between a first aperture and a second aperture. Typically, the shearing member is a plate that, in normal operating conditions, blocks rearward movement of the pusher rods. However, when a predetermined shear force is applied to the plate, the shearing member becomes sheared and the pusher rod retracts within the channel thereby alleviating the pressure. The failsafe device can be paired with a seizure detection system that: (i) uses a laser beam that detects seizure of the piston and the valve gate, and (ii) provides appropriate notification or control signals.

U.S. Pat. No. 6,755,641 (Inventor: NAKANISHI; Publication Date: Jun. 29, 2004) discloses a stack injection molding apparatus that has: (i) a first arrays of valve gate injection nozzles, (ii) a second array of valve gate injection nozzles, and (iii) separate mechanisms for independently actuating the nozzles of each array. A separate reciprocating yoke plate engages the valve pins of each nozzle array. The yoke plate is actuated by either one centrally located actuator or a pair of symmetrically located actuators.

U.S. Pat. No. 7,131,834 (Inventor: BABIN et al.; Publication Date: Nov. 11, 2006) discloses an adjustment device for a valve pin on an injection molding machine, and particularly on a multi-cavity machine having a plurality of valve pins mounted on a common yoke plate, which is actuated by a common actuator. The adjustment device includes: (i) a pin holder for holding the valve pin, and (ii) a locking member. The pin holder has two threaded portions. The first threaded portion is adjustable within a threaded receiving hole in the yoke plate. The second threaded portion is received by the locking member. The locking member has a bottom shoulder which butts against the yoke plate, and retains the pin holder in place.

SUMMARY

For the case where articles are manufactured using an injection molding machine that has a hot runner including hot-runner nozzles having multiple valve stems to shut off flow of a molten molding material (also called a "melt" or a "plastic", etc), it may be an advantage to attach the multiple valve stems to a single actuation plate. By moving the single actuation plate, the multiple valve stems are allowed to simultaneously fill multiple mold cavities of a mold that are coupled with respective hot-runner nozzles. When actuating the multiple valve stems by moving the single actuation plate, it may be possible, unfortunately, for a single valve stem to become obstructed (such as the case that may occur when the single valve stem becomes seized and/or a mold gate becomes frozen), and in such a circumstance, the single valve stem inadvertently takes an entire load (force) from the single actuation plate; this undesirable condition may result in: (i) failure to move (or to operate) the single valve stem when it is desired to do so, and (ii) inadvertent damage to other components of the hot runner and/or of the hot runner nozzle. Unfortunately, this condition leads causes: increased downtime, reduced productivity, and increased operating costs associated with the molding system.

An aspect of the present invention provides a hot runner having a safety connector releasably interlocking a valve stem with an actuation plate so that in response to movement of the actuation plate, the valve stem becomes movable, and the safety connector is configured to release the valve stem from the actuation plate responsive to a predetermined undesired force acting on the valve stem, so that the actuation plate may continue to operate without the valve stem that became released.

Another aspect of the present invention provides a hot runner, including: (i) a hot runner nozzle having a melt channel being connected with a manifold, the melt channel for delivering a molten molding material to a mold; (ii) an actuation plate being offset from the hot runner nozzle, the actuation plate being configured to move responsive to becoming actuated to do so; (iii) a valve stem being positioned, at least in part, along the melt channel of the hot runner nozzle, the valve stem being configured to be moved, at least partially, along the melt channel of the hot runner nozzle; and (iv) a safety connector, including: (a) a latch releasably interlocking the valve stem with the actuation plate so that in response to movement of the actuation plate, the valve stem becomes movable; and (b) a latch mover being cooperative with the latch, and the latch mover being configured to move the latch responsive to a predetermined undesired force acting on the valve stem so that so that the valve stem is released from the actuation plate.

A technical effect of the aspects of the present invention allows the valve stem to become decoupled or disconnected or released from the actuation plate so as to: (i) prevent inadvertent damage to the valve stem and/or other components associated with the hot runner, and (ii) allow the valve stem to become reattached to the actuation plate once an obstruction associated with the valve stem is cleared.

DETAILED DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE
NON-LIMITING EMBODIMENTS

Figure 1:
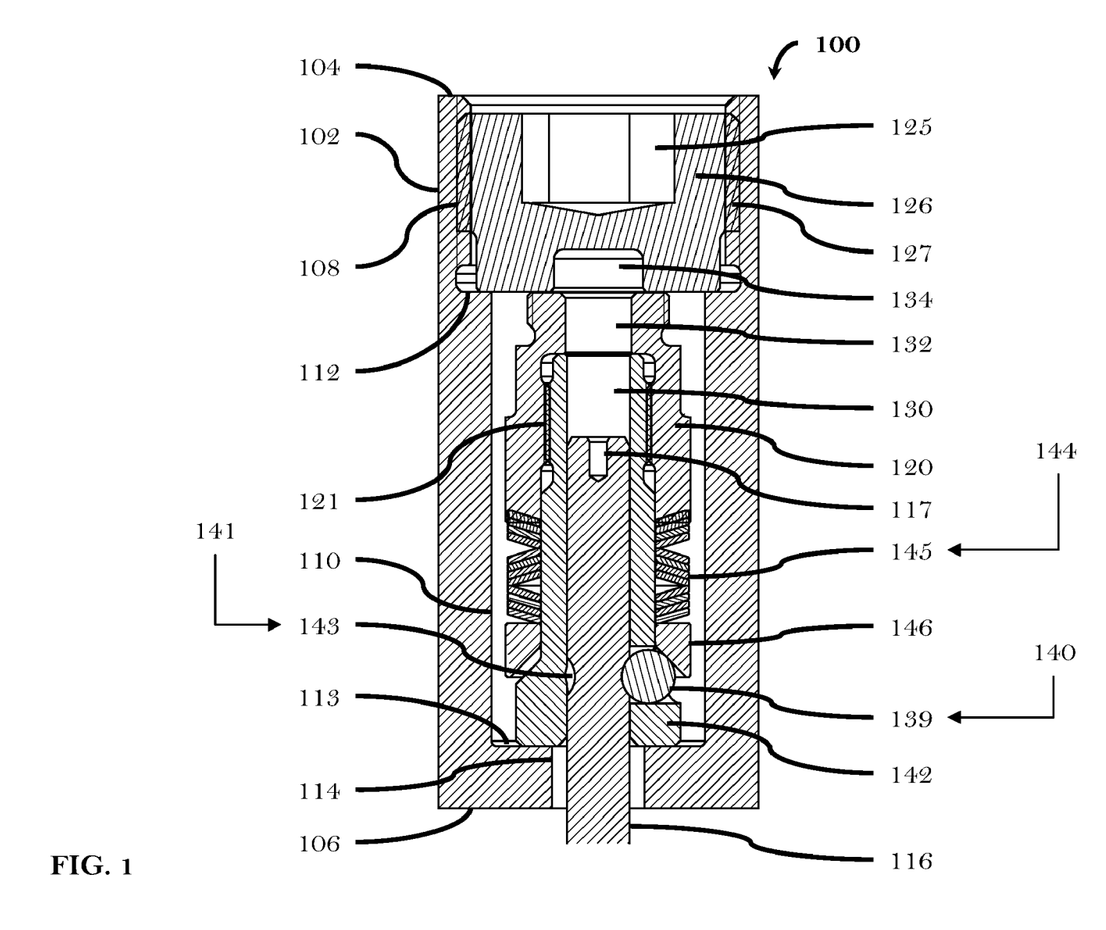
FIG. 1 depicts a longitudinal cross-sectional view of a safety connector 100 (hereafter referred to as the "connector 100") according to a first non-limiting embodiment.
Figure 4A:
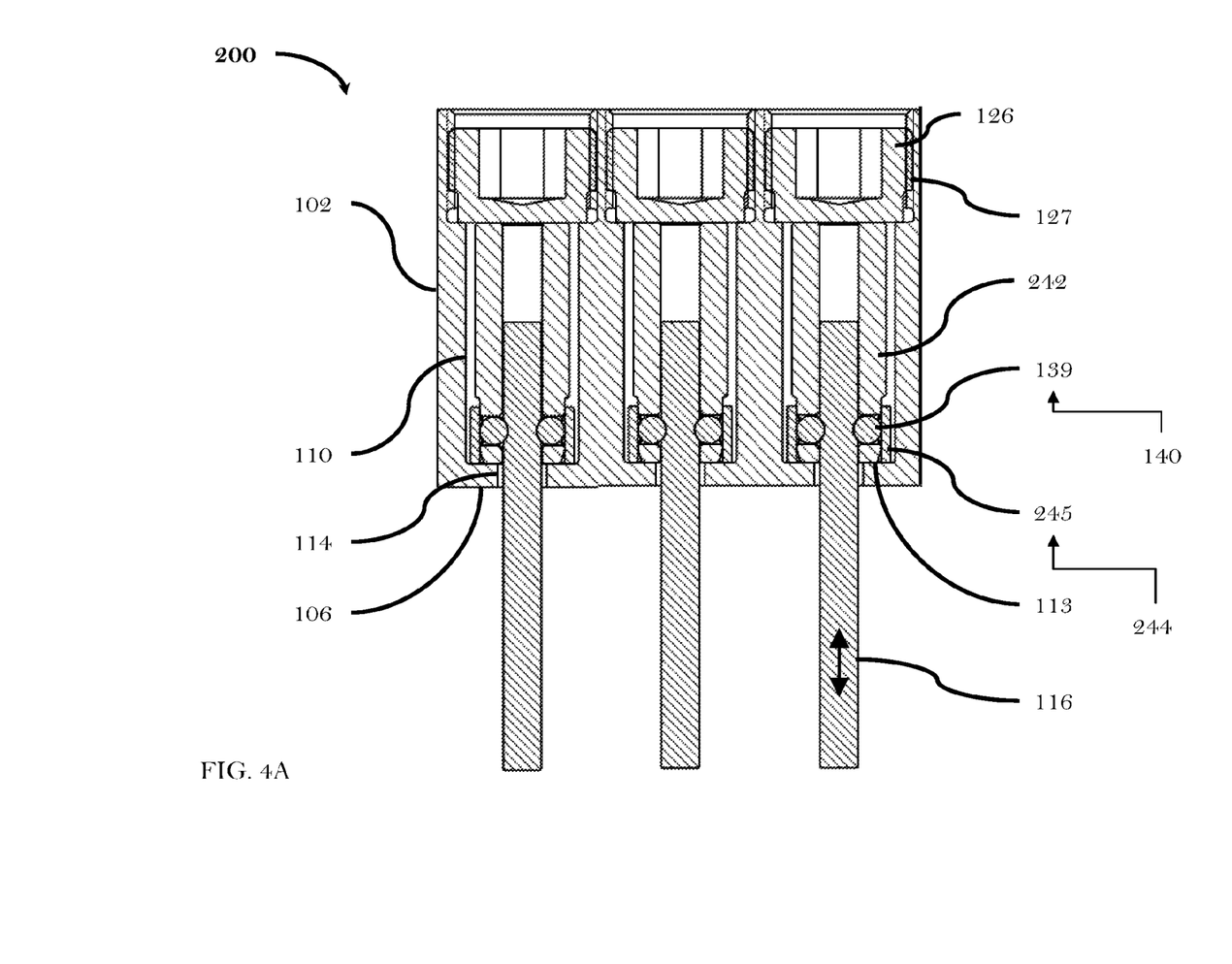
FIGS. 4A and 4B depict longitudinal cross-sectional views of a safety connector 200 (hereafter referred to as the "connector 200") according to a second non-limiting embodiment.
Figures 5A, 5B:
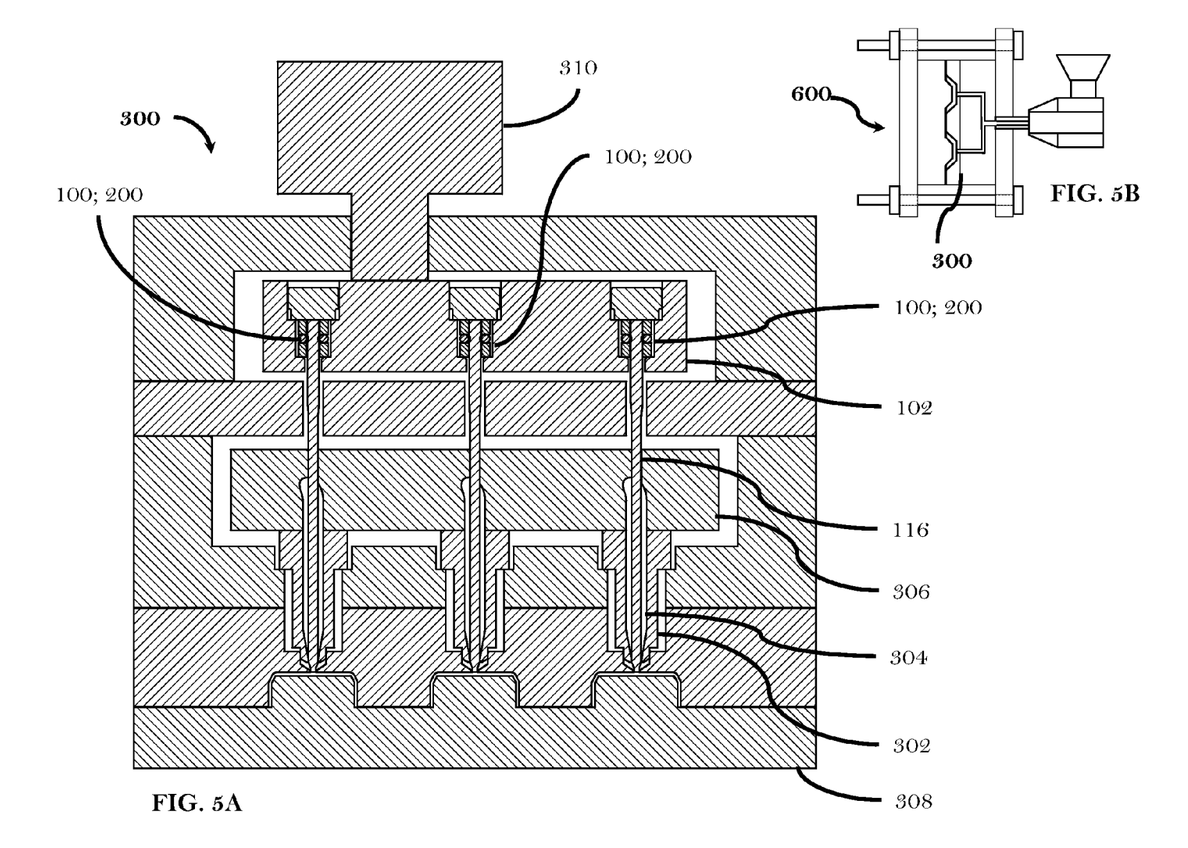
FIG. 5A depicts a cross-sectional view of a hot runner 300 that uses the connector 100 of FIG. 1 and/or the connector 200 of FIG. 4A.
FIG. 5B depicts a schematic view of a molding system 600 that uses the hot runner 300 of FIG. 5A.

FIG. 1 depicts the longitudinal cross-sectional view of the connector 100. The connector 100 is used in the hot runner 300 (depicted in FIG. 5A). The hot runner 300 has a valve stem 116 and an actuation plate 102. Preferably, the hot runner 300 includes a plurality of valve stems, but FIG. 1 depicts one valve stem 116 for convenient description of the connector 100; FIGS. 4A and 5A depict a plurality of valve stems 116 used with the actuation plate 102. The connector 100 includes: (i) a latch 140, and (ii) a latch mover 144. The latch 140 is configured to releasably interlock the valve stem 116 with the actuation plate 102. The meaning of "releasably interlock" is as follows: the latch 140 is used to: (i) interlock the valve stem 116 with the actuation plate 102 (for the case where there is no adverse force acting on the valve stem 116), (ii) release the valve stem 116 from being interlocked with the actuation plate 102 (for the case where the adverse force acts on the valve stem 116), and (iii) re-interlock the valve stem 116 with the actuation plate 102 (for the case where the adverse force no longer acts on the valve stem 116). It will be appreciated that re-interlocking the valve stem 116 with the actuation plate 102 may be accomplished either: (i) manually via human operator intervention, or (ii) automatically (that is, without operator intervention); the option for re-interlocking the valve stem 116 with the actuation plate 102 are explained below. The latch 140 is movable between an interlocked position and a release position. FIG. 1 depicts the latch 140 in the interlocked position. FIG. 3B depicts the latch 140 in the release position. Once the latch 140 is moved to the interlocked position, the latch 140 contacts (that is, positively contacts) the valve stem 116 so that the latch 140 interlocks the valve stem 116 with the actuation plate 102 (that is, some part or element or component of the actuation plate 102). In this manner, under normal operating conditions, the valve stem 116 becomes movable along with the actuation plate 102 in response to movement of the actuation plate 102, in the absence of a condition that may inadvertently prevent the valve stem 116 from being moved. The latch mover 144 is: (i) coupled with the latch 140, and (ii) configured to move or urge the latch 140 from the release position to the interlocked position. In the interlocked position (as depicted in FIG. 1), once a predetermined undesired force acts on the valve stem 116 and the latch 140 (which contacts the valve stem 116), the latch 140 moves (overcome) the latch mover 144 aside, so as to permit the latch 140 to move from the interlocked position to the release position, and in this case the latch 140 releases the valve stem 116 from the actuation plate 102. After the predetermined undesired force is received by the valve stem 116 and the latch 140 (so that the valve stem 116 may become released from the actuation plate 102), the latch 140 detaches from the valve stem 116 but remains associated with the actuation plate 102, and the valve stem 116 becomes decoupled (released) from the actuation plate 102.

According to a non-limiting variant, the valve stem 116 defines a latch receiver 141 that is configured to receive, at least in part, the latch 140. The latch mover 144 is configured to move the latch 140 into, at least in part, the latch receiver 141 once the latch 140 is lined up with the latch receiver 141, so that the latch 140 interlocks the valve stem 116 with the actuation plate 102. The latch mover 144 is also configured to permit the latch 140 to leave the latch receiver 141 in response to the predetermined undesired force acting on the latch 140 so that, in this case the latch 140 leaves the latch receiver 141 and the valve stem 116 become released from the actuation plate 102. The valve stem 116, after becoming detached from the latch 140 and if the valve stem 116 is not damaged (so as to be advantageously reused), the valve stem 116 may be reconnected (manually or automatically) with the latch 140 so that the valve stem 116 may be reconnected with the actuation plate 102 and the latch 140 is (advantageously) re-used. The manner of automatic reattachment of the valve stem 116 with the actuation plate 102 is described in association with FIG. 3A. The manner of manual (operator) reattachment of the valve stem 116 with the actuation plate 102 is described in association with FIG. 3C. Advantageously, the valve stem 116 may be non-destructively released from the actuation plate 102 in response to the predetermined undesired force acting on the valve stem 116. The valve stem 116 may then be re-interlocked with the actuation plate 102 after the valve stem 116 is released from the actuation plate 102.

The actuation plate 102 includes: (i) a first surface 104, (ii) a second surface 106 that is offset from the first surface 104, and (iii) a channel 114. The actuation plate 102 defines: (i) a first bore 108, and (ii) a second bore 110. The first bore 108 extends from the first surface 104 toward the second surface 106. The second bore 110 extends from the end of the first bore 108 toward the second surface 106. A first stop 112 is located between the first bore 108 and the second bore 110. The channel 114 extends from the end of the second bore 110 to the second surface 106. A second stop 113 is located between the second bore 110 and the channel 114. The valve stem 116 is received in the first bore 108, the channel 114 and the second bore 110 of the actuation plate 102. The latch 140 and the latch mover 144 are positioned and remain in the second bore 110.

Figure 2:
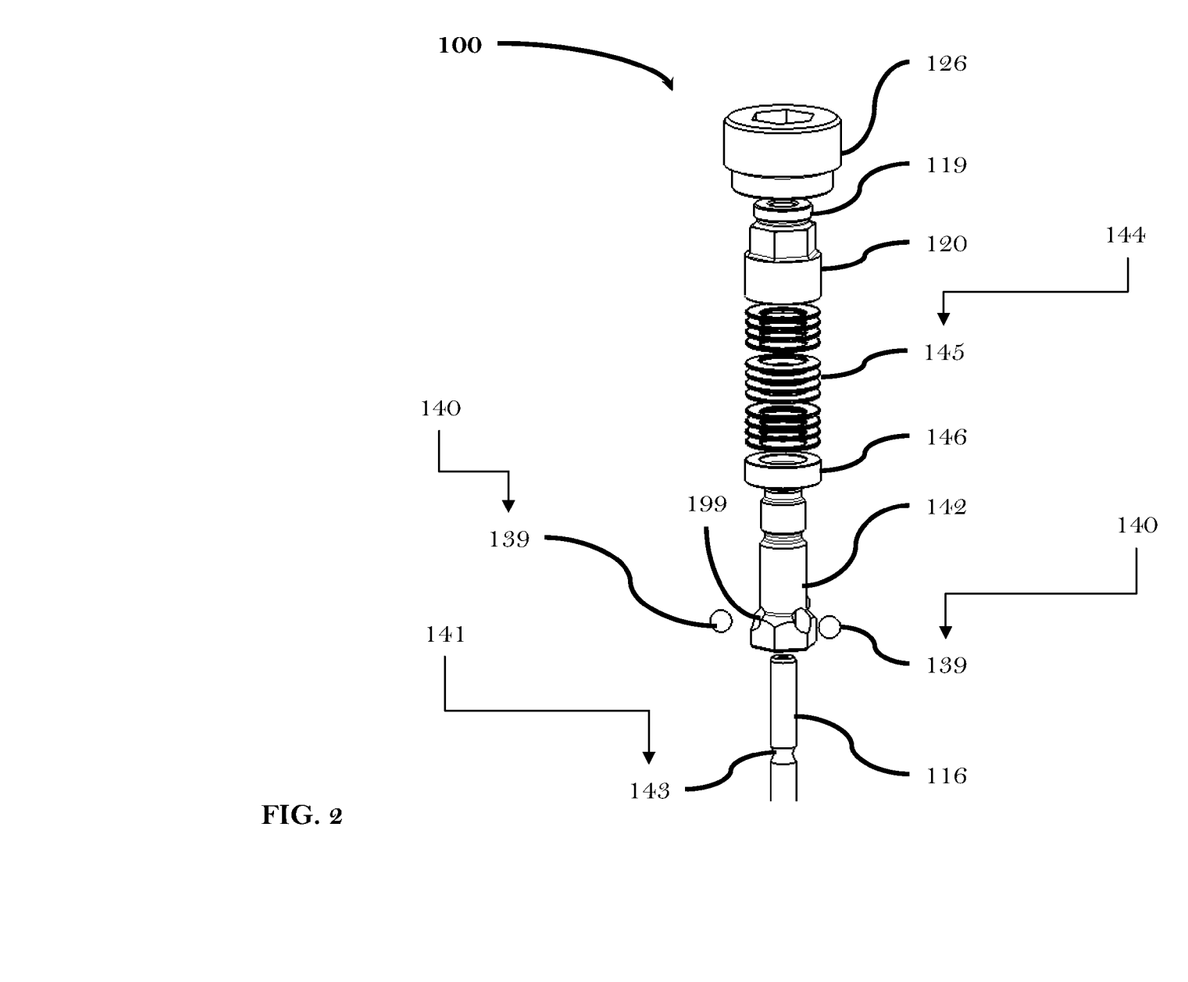
FIG. 2 depicts an exploded view of the connector 100 of FIG. 1.

The actuation plate 102 further includes a plug 126, which is coupled with the actuation plate 102, preferably threadably coupled with threads 127. According to a non-limiting variant, the plug 126 defines a HEX hole 125 for receiving an Allen wrench so that the plug 126 may be installed into the first bore 108. According to a non-limiting variant, the plug 126 defines a stem receiver 134 that is located along a central longitudinal axis of the valve stem 116, and the stem receiver 134 is used to receive the valve stem 116 once the valve stem 116 becomes decoupled from the latch 140. The valve stem 116 defines a tooling center 117 that is a by product of manufacturing the valve stem 116; it will be appreciated that the tooling center 117 is not used in the operation of the latch 140. The valve stem 116 defines the latch receiver 141. By way of example, the latch receiver 141 may include a detent groove 143 that is shaped as a circumferential groove defined on the outer surface of the valve stem 116. The latch receiver 141 acts as a detent and is configured to receive the latch 140. By way of example, the latch 140 may include a ball bearing 139. According to another non-limiting variant (which is depicted in FIG. 2), the latch receiver 141 retains several ball bearings (or latches). By way of example, the latch mover 144 may include a spring 145, such as a Bellville spring or other suitable type of spring. A collection of stacked Bellville springs is depicted in FIG. 1. The Bellville springs, when used, may be stacked in series, stacked in parallel, or arranged in any suitable combination. The latch mover 144 imparts a biasing force along a direction that is parallel with the longitudinal axis of the valve stem 116.

The actuation plate 102 further includes a latch retainer 142. Before the plug 126 is coupled with the actuation plate 102, the latch retainer 142 is received in the second bore 110 of the actuation plate 102. The plug 126 (once installed to the actuation plate 102) and the second stop 113 prevent the latch retainer 142 from leaving the second bore 110 of the actuation plate 102. The latch retainer 142 abuts the second stop 113. The latch retainer 142 is configured to: (i) define a latch passageway that receives the latch 140, (ii) permit movement of the latch 140 either toward the latch receiver 141 or away from the latch receiver 141, and (iii) define a stem channel 130 (which is centrally aligned) that passes through the latch retainer 142, and the stem channel 130 axially receives the valve stem 116. The latch passageway passes through the latch retainer 142 so that the latch 140 may be moved so as to become received by the latch receiver 141 once the latch receiver 141 is aligned with the latch 140.

The actuation plate 102 further includes a stem head 120 that is: (i) received in the second bore 110, and (ii) coupled with the latch retainer 142 (preferably, threadably coupled via threads 121). The stem head 120 defines a stem passage 132 along the central longitudinal axis that extends through the stem head 120. The stem passage 132 is for receiving the valve stem 116 once the valve stem 116 becomes decoupled from the latch 140. For the case where the latch 140 is no longer being received by the latch receiver 141, the valve stem 116 is free to move along the stem channel 130 and the stem passage 132 (and as well as along the stem receiver 134 if the stem receiver 134 is installed in the plug 126).

The actuation plate 102 further includes a spacer 146 that defines a central channel that extends through the body of the spacer 146, so that the spacer 146 may be received over the outer diameter of the latch retainer 142. The spacer 146 abuts the latch 140. According to a non-limiting variant, the spacer 146 includes a conically-shaped surface (that is, an angled surface) that faces and makes contact with the ball bearing 139. The latch mover 144 is located between the spacer 146 and the stem head 120. The latch mover 144 abuts the spacer 146 and abuts the stem head 120. The latch mover 144 is biased so as to urge the spacer 146 against the latch 140 so that once the latch 140 and the latch receiver 141 are aligned with each other, the latch 140 may slip into the latch receiver 141.

Under a normal operating case of the valve stem 116: (i) the latch 140 is received in the latch receiver 141, (ii) the latch mover 144 biases the spacer 146 against the latch 140, and the latch 140 is kept engaged with the latch receiver 141, and (iii) the combination of the stem head 120 and the latch retainer 142 is kept immobile in the second bore 110 (between the plug 126 and the second stop 113) because the combination of the plug 126 and the second stop 113 prevent the combination of the stem head 120 and the latch retainer 142 from leaving the second bore 110 of the actuation plate 102. In the normal operating case, once the actuation plate 102 is moved, the valve stem 116 will also be moved along with the actuation plate 102.

However, for the case in which the predetermined undesired force acts on the latch 140 and the valve stem 116 (while the latch 140 is engaged with the latch receiver 141), the valve stem 116 is moved so that the latch mover 144 no longer biases the latch 140 into the latch receiver 141, and in this case the latch 140 leaves the latch receiver 141. Once the latch 140 leaves the latch receiver 141, the valve stem 116 becomes decoupled from the actuation plate 102, and operation of the hot runner 300 (which is depicted in FIG. 5A) may be stopped (if so desired) so that the valve stem 116 may be positioned or readjusted so that the latch 140 may become urged back into the latch receiver 141 so as to interlock the valve stem 116 with the actuation plate 102.

In the interlocked position (which may be called a "home position"), the latch 140 is received by the latch receiver 141. The latch 140 is held along a radial direction relative to the valve stem 116 by the latch retainer 142. Once the stem head 120 is tightened (via the threads 121), the latch mover 144 becomes compressed. Compression of the latch mover 144 forces the spacer 146 against the latch 140, and holds the latch 140 in the latch receiver 141. The strength of the latch mover 144 (that is, the number and arrangement of the spring 145) is designed to give a specific displacement at a given load, such that the latch 140 may disengage from the latch receiver 141 at the predetermined undesired force or load that acts axially along the valve stem 116. When the undesired force or load is experienced by the valve stem 116 (that is, the valve stem 116 receives the undesired force), the latch 140 is moved so as to cause the spring 145 to compress further so that the latch 140 is allowed to come out of the latch receiver 141, thereby decoupling the valve stem 116 from the actuation plate 102. An initial clearance between the valve stem 116 and the plug 126 ensures that the actuation plate 102 may continue to traverse a full range of motion of the actuation plate 102 regardless of the position of valve stem 116 is in when the valve stem 116 becomes decoupled from the actuation plate 102.

For the case where the valve stem 116 has become seized and can no longer operate under normal conditions, the actuation plate 102 moves back and forth past the valve stem 116, and the latch 140 enters and exits (repeatedly) the latch receiver 141 with each cycle (that is, with each stroke of the actuation plate 102). For the case where the predetermined undesired force or load that acts on the valve stem 116 decreases below the level of the predetermined undesired force, the latch 140 is once again moved into the latch receiver 141, and the valve stem 116 becomes reattached to the actuation plate 102.

Regarding the size of the ball bearing 139, the diameter of the valve stem 116 and its corresponding channel through the latch retainer 142 appear to be sized such that if the upper end of the valve stem 116 is withdrawn past the location of the ball bearing 139 location, the ball bearing 139 could fall into the channel and the device may subsequently fail, and this condition may be avoided by choosing an appropriate size for the ball bearing 139.

FIG. 2 depicts the exploded view of the connector 100 of FIG. 1. The latch retainer 142 has multiple radial holes 199, each radial hole 199 is used to hold or retain a respective ball bearing 139 (or a respective latch 140). The stem head 120 includes a threaded portion 119; a tool (not depicted) is screwed (or coupled) to the threaded portion 119, and the tool is used to pull the valve stem 116 from the hot runner 300.

Figure 3A:
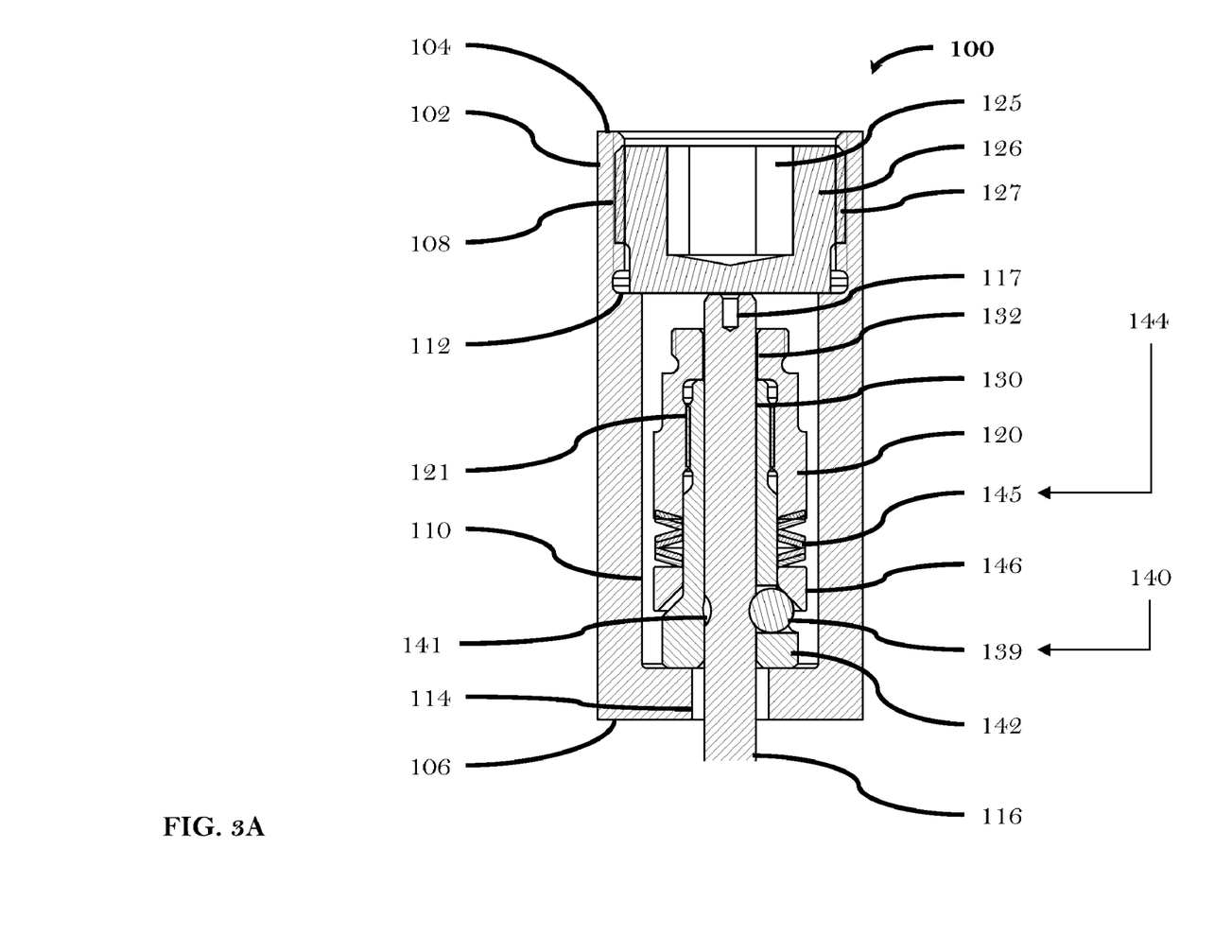
FIGS. 3A, 3B and 3C depict additional cross-sectional views of a non-limiting variant of the connector 100 of FIG. 1.
Figure 3B:
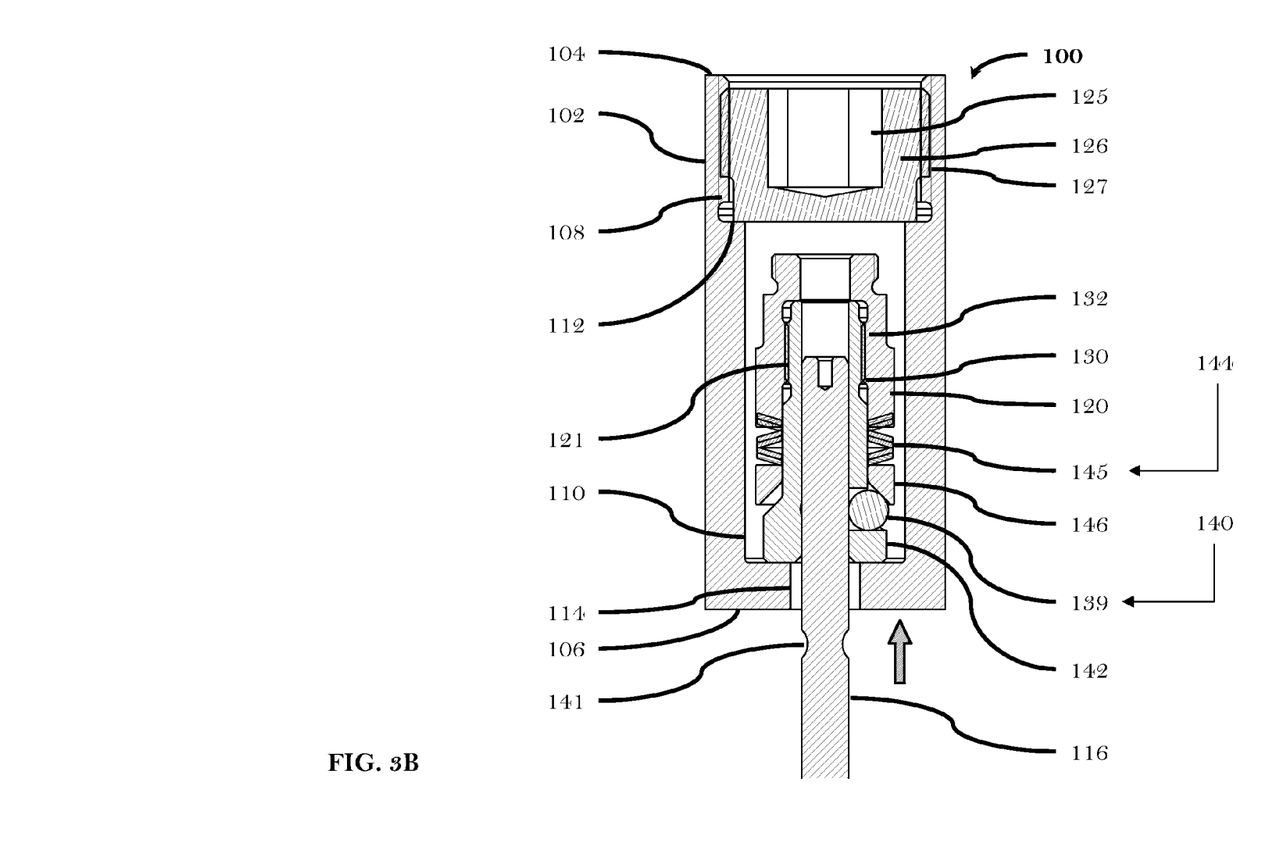
Figure 3C:
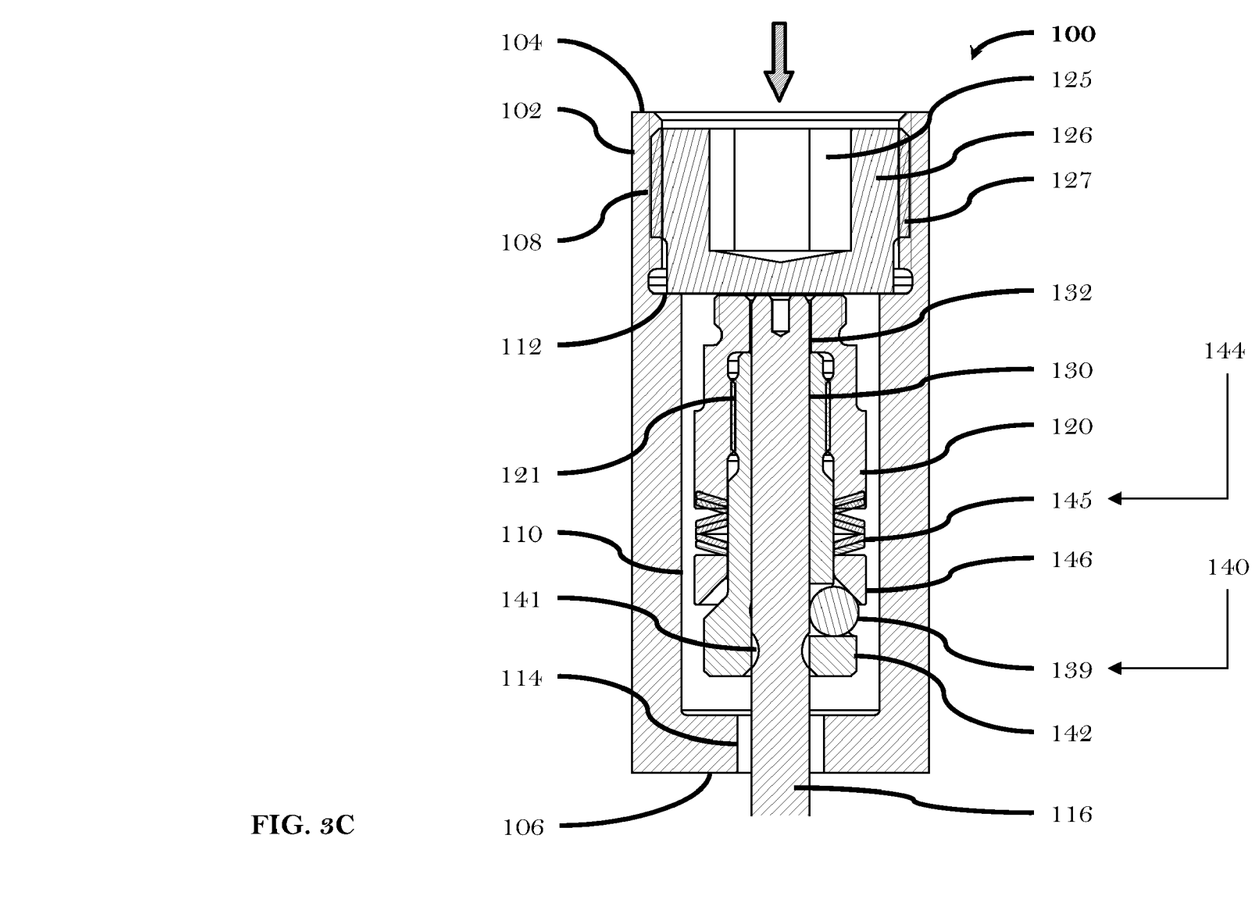

FIGS. 3A, 3B and 3C depict the cross-sectional views of the non-limiting variant of the connector 100 of FIG. 1 (in which the stem receiver 134 is not depicted). According to this non-limiting variant, in the interlocked position, there is no-initial clearance between the valve stem 116 and the plug 126 (so that the valve stem 116 abuts the plug 126), but there is an initial clearance between the plug 126 and the stem head 120 (so that the plug 126 is offset from the stem head 120). According to this non-limiting variant, (i) a force is transmitted directly from the plug 126 to the valve stem 116 during a gate-closing portion of the stroke of the actuation plate 102, and (ii) decoupling of the valve stem 116 from the actuation plate 102 is intended to occur only when the valve stem 116 seizes in a gate-closed position of the actuation plate 102.

FIG. 3B depicts another non-limiting variant of the connector 100 of FIG. 1; in the release position, as the actuation plate 102 retracts, the load on the latch mover 144 is exceeded (that is, beyond the level of the predetermined undesired force), and the latch 140 disengages from the latch receiver 141, as described in the preceding paragraph.

FIG. 3C depicts yet another non-limiting variant of the connector 100 of FIG. 1; in the release position, the actuation plate 102 again returns to the gate-closed position, and the actuation plate 102 contacts and moves the stem head 120, but because of an initial clearance between the plug 126 and the stem head 120, the latch retainer 142 is not pushed far enough for the latch 140 to re-engage with the latch receiver 141 because the valve stem 116 has seized. According to this non-limiting variant, because the latch 140 does not repeatedly enter and exit the latch receiver 141 (in the release position), the wear life of the valve stem 116 and the latch receiver 141 may be extended. In this case, reattachment of the valve stem 116 to the actuation plate 102 requires manual intervention.

Figure 4B:
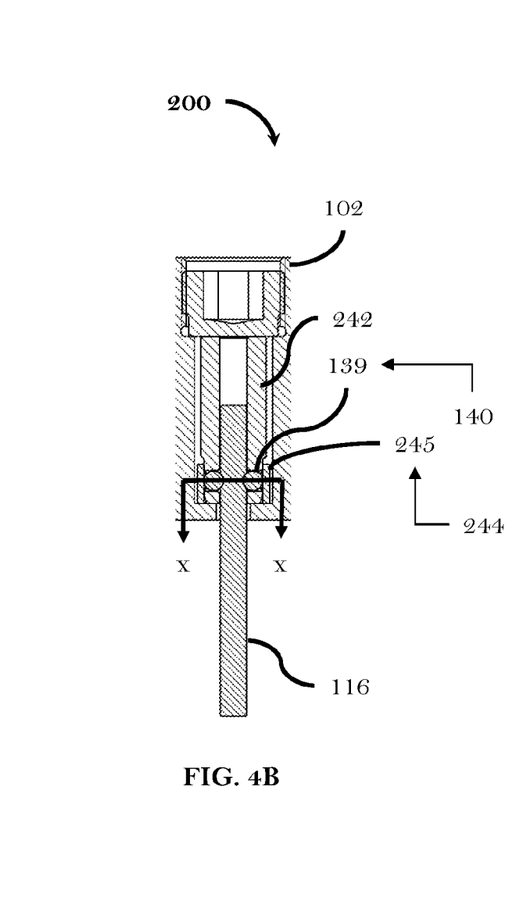

FIGS. 4A and 4B depict the longitudinal cross-sectional views of the connector 200. To facilitate an understanding of the connector 200, elements of the connector 200 (that are different from those of the connector 100) are identified by reference numerals that use a two-hundred designation rather than a one-hundred designation (as used in the connector 100). The actuation plate 102 further includes: (i) a latch mover 244 in replacement of the latch mover 144, and (ii) a latch retainer 242 in replacement of the latch retainer 142. The latch mover 244 acts in a radial direction relative to the valve stem 116, while the latch mover 144 acts in a direction that is parallel with the axial direction of the valve stem 116. For example, the latch mover 244 includes a radial spring 245 that enwraps the outer circumference of the latch retainer 242 so as to cover the latch 140. The radial spring 245 may include a C-shaped hollow cylinder, for example. The radial spring 245 forces the ball bearing 139 to remain in the latch receiver 141 of the valve stem 116. The latch mover 244 replaces the functions provided by the spacer 146 and the latch mover 144 as depicted in FIGS. 1, 2, 3A, 3B and 3C. The latch retainer 242 abuts the plug 126 and the second stop 113.

Figure 4C:
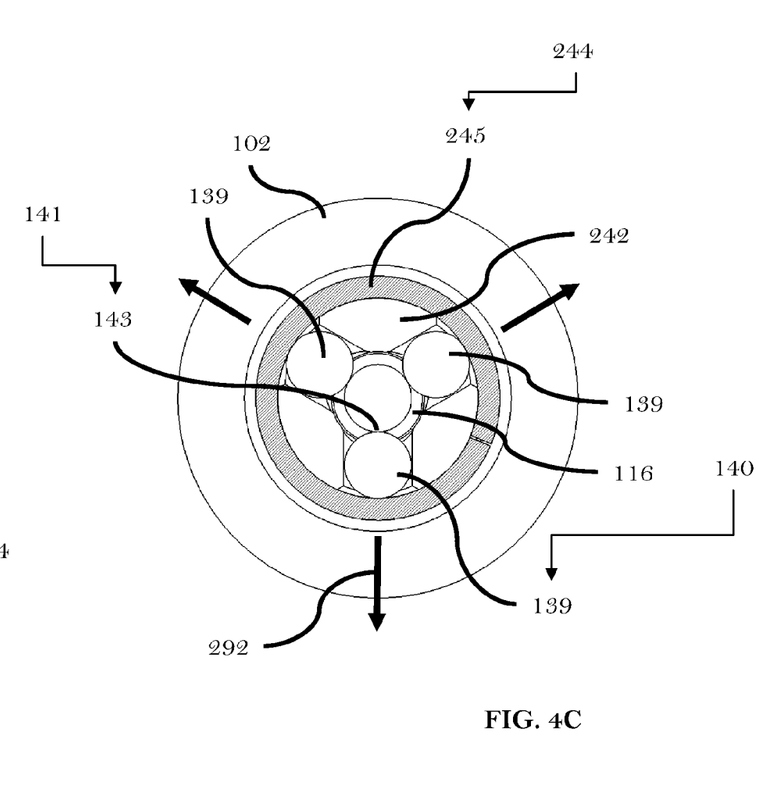
FIG. 4C depicts a radial cross-sectional view of the connector 200 of FIG. 4A.

FIG. 4C depicts the radial cross-sectional view of the connector 200 of FIG. 4A taken along the line X-X which is depicted in FIG. 4B. The latch 140 (depicted as the ball bearing 139) is movable along a radial direction 292 relative to the longitudinal axis of the valve stem 116.

Figure 4D:
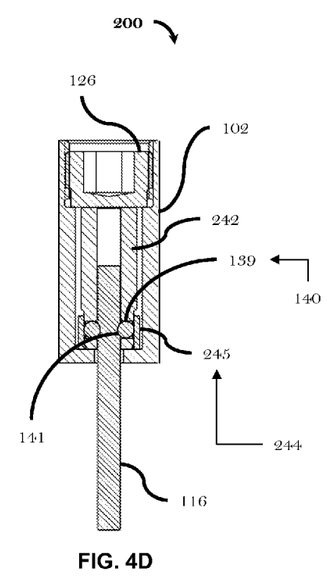
FIGS. 4D, 4E and 4F depict additional longitudinal cross-sectional views of the connector 200 of FIG. 4A.
Figure 4E:
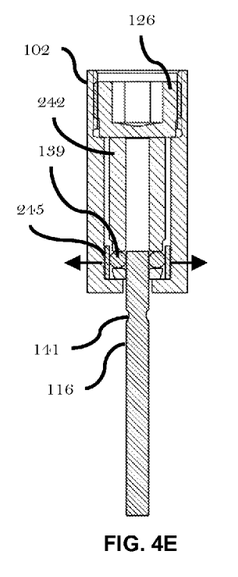
Figure 4F:
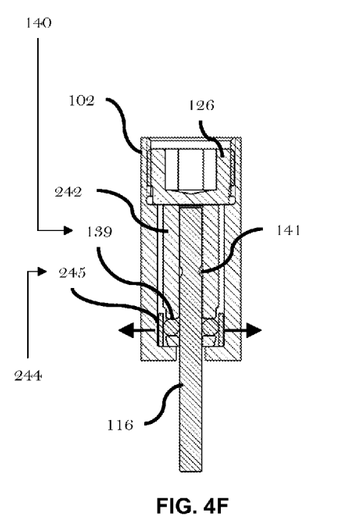

FIGS. 4D, 4E and 4F depict the additional longitudinal cross-sectional views of the connector 200 of FIG. 4A. For the case where a valve stem 116 fails to actuate or more than one valve stem fails to actuate, axial movement of the actuation plate 102 will force the latch 140 to fully disengage from the latch receiver 141, so that the valve stem 116 and the actuation plate 102 may decouple from each other, and allow the actuation plate 102 and any remaining valve stems that are coupled to the actuation plate 102 to continue operating while the valve stem 116 remains decoupled and inoperative. The connector 100 and 200 permits the valve stem 116 to non-destructively detach from the actuation plate 102, and this manner, damage may be prevented to the valve stem 116 and/or other components. Non-destructive detachment means that the components of the connector 100 and/or the connector 200 are reusable. According to one case, detachment and reattachment of the valve stem 116 relative to the actuation plate 102 occurs automatically at any position in the stroke of the actuation plate 102. According to another case, automatic detachment may occur only when the valve stem 116 is in the gate-closed position. The absence of automatic reattachment of the valve stem 116 with the actuation plate 102 may help to prevent wear of the latch receiver 141. However, the latch receiver 141 may be treated with suitable methods or materials to improve its strength and wear characteristics so as to reduce wear to the latch receiver 141.

FIGS. 5A and 5B depict the schematic views of the hot runner 300 and the molding system 600 that uses the connector 100 of FIG. 1 and/or the connector 200 of FIG. 4A. The hot runner 300 includes a hot runner nozzle 302 that has a melt channel 304. The melt channel 304 is connected with a manifold 306. A plate actuator 310 is connected with the actuation plate 102. The melt channel 304 is for delivering a molten molding material to a mold 308. The actuation plate 102 is offset from the hot runner nozzle 302. The actuation plate 102 is configured to move responsive to becoming actuated to do so. The valve stem 116 is positioned, at least in part, along the melt channel 304 of the hot runner nozzle 302. The valve stem 116 is configured to be moved, at least partially, along the melt channel 304 of the hot runner nozzle 302. The connector 100 and/or the connector 200 may be used with the hot runner 300.

The description of the non-limiting embodiments (above) provides non-limiting examples of the present invention;

these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

What is claimed is:

1. A hot runner of a molding system, the hot runner comprising:
   a valve stem;
   an actuation plate; and
   a safety connector, including:
      a latch releasably interlocking the valve stem with the actuation plate, once the latch has interlocked the valve stem with the actuation plate, the valve stem becomes movable in response to movement of the actuation plate.

2. The hot runner of claim 1, further comprising:
   a latch mover being cooperative with the latch, and the latch mover being configured to move the latch responsive to a predetermined undesired force acting on the latch, so that so that the valve stem is released from the actuation plate, so that the actuation plate may continue to operate without the valve stem that became released from the actuation plate.

3. The hot runner of claim 2, wherein:
   the latch and the latch mover being configured to:
      (i) allow the valve stem to become released from the actuation plate so as to prevent inadvertent damage to components associated with the hot runner, and
      (ii) allow the valve stem to become reattached to the actuation plate once an obstruction associated with the valve stem is cleared.

4. The hot runner of claim 2, wherein:
   the valve stem defines a latch receiver, the latch receiver being configured to receive, at least in part, the latch, and the latch mover is configured to:
      (i) move the latch into, at least in part, the latch receiver once the latch is lined up with the latch receiver, so that the latch interlocks the valve stem with the actuation plate, and
      (ii) permit the latch to leave the latch receiver responsive to the predetermined undesired force acting on the latch so that, where the latch leaves the latch receiver, the valve stem may become released from the actuation plate.

5. The hot runner of claim 2, wherein:
   the valve stem, after becoming detached from the latch and if the valve stem is not damaged, the valve stem may be reconnected with the latch so that the valve stem may become reconnected with the actuation plate.

6. The hot runner of claim 2, wherein:
   the valve stem defines a latch receiver, the latch receiver including:
      a detent groove being shaped as a circumferential groove defined on an outer surface of the valve stem.

7. The hot runner of claim 2, wherein:
   the latch includes:
      a ball bearing.

8. The hot runner of claim 2, wherein:
   the latch mover includes:
      a spring.

9. The hot runner of claim 2, wherein:
   the actuation plate further includes:
      a latch retainer being received in a second bore of the actuation plate;
      a plug;
      a second stop, the plug and the second stop of the actuation plate prevent the latch retainer from leaving the second bore of the actuation plate, the latch retainer is configured to: (i) define a latch passageway that receives the latch, (ii) permit movement of the latch either toward a latch receiver associated with the valve stem or away from the latch receiver, and (iii) define a stem channel that passes through the latch retainer, and the stem channel axially receives the valve stem, and the latch passageway passes through the latch retainer so that the latch may be moved so as to become received by the latch receiver once the latch receiver is aligned with or lined up with the latch.

10. The hot runner of claim 9, wherein:
    the actuation plate further includes:
       a stem head being: (i) received in the second bore, and (ii) coupled with the latch retainer, the stem head defining a stem passage along a central longitudinal axis that extends through the stem head, the stem passage for receiving the valve stem once the valve stem becomes decoupled from the latch, and where the latch is no longer being received by the latch receiver, the valve stem is free to move along the stem channel and the stem passage.

11. The hot runner of claim 10, wherein:
    the actuation plate further includes:
       a spacer defining a central channel that extends through the spacer, so that the spacer is received over an outer diameter of the latch retainer, the spacer abuts the latch, and the spacer includes:
          a conically-shaped surface that faces and makes contact with the latch, and
       wherein:
          the latch includes:
             a ball bearing, and
       the latch mover is located between the spacer and the stem head, the latch mover abuts the spacer and abuts the stem head, the latch mover is biased so as to urge the spacer against the latch so that once the latch and the latch receiver are aligned with each other, the latch may slip into the latch receiver.

12. The hot runner of claim 11, wherein:
    under a normal operating case of the valve stem: (i) the latch is received in the latch receiver, (ii) the latch mover biases the spacer against the latch, and the latch is kept engaged with the latch receiver, and (iii) a combination of the stem head and the latch retainer is kept immobile in the second bore, in the normal operating case, once the actuation plate is moved, the valve stem is also moved.

13. The hot runner of claim 2, wherein:
the latch mover acts in a direction that is parallel with an axial direction of the valve stem.

14. The hot runner of claim 2, wherein:
the latch mover acts in a radial direction relative to the valve stem.

15. The hot runner of claim 2, wherein:
the actuation plate further includes:
- a latch retainer;
- a stem head; and
- a latch receiver being defined by the valve stem, in a release position, the actuation plate returns to a gate-closed position, and the actuation plate contacts and moves the stem head, but because of an initial clearance between a plug and the stem head, the latch retainer is not pushed far enough for the latch to re-engage with the latch receiver because the valve stem has seized, and because the latch does not repeatedly enter and exit the latch receiver in the release position, and wear life of the valve stem and the latch receiver may be extended, and reattachment of the valve stem to the actuation plate requires manual intervention.

16. The hot runner of claim 9, wherein:
the latch mover includes:
- a radial spring that enwraps an outer circumference of the latch retainer so as to cover the latch.

17. A hot runner for molding system, the hot runner comprising:
- a valve stem;
- an actuation plate; and
- a safety connector, including:
  - a latch being associated with the actuation plate, the latch being configured to releasably interlock the valve stem with the actuation plate, the latch being movable between an interlocked position and a release position, and once the latch is moved to the interlocked position, the latch contacts the valve stem so that the latch interlocks the valve stem with the actuation plate, and the valve stem becomes movable in response to movement of the actuation plate in an absence of any other condition that inadvertently prevents the valve stem from become moved; and
  - a latch mover being: (i) coupled with the latch, and (ii) configured to move the latch from the release position to the interlocked position, and in the interlocked position, once a predetermined undesired force acts on the valve stem and the latch, the latch overcomes the latch mover so as to permit the latch to move from the interlocked position to the release position, so that the latch releases the valve stem from the actuation plate.

18. A hot runner for a molding system, the hot runner comprising:
- a hot runner nozzle having a melt channel being connected with a manifold, the melt channel for delivering a molten molding material to a mold;
- an actuation plate being offset from the hot runner nozzle, the actuation plate being configured to move responsive to becoming actuated to do so;
- a valve stem being positioned, at least in part, along the melt channel of the hot runner nozzle, the valve stem being configured to be moved, at least partially, along the melt channel of the hot runner nozzle; and
- a safety connector, including:
  - a latch releasably interlocking the valve stem with the actuation plate so that in response to movement of the actuation plate, the valve stem becomes movable; and
  - a latch mover being cooperative with the latch, and the latch mover being configured to move the latch responsive to a predetermined undesired force acting on the latch, so that so that the valve stem is released from the actuation plate.

19. A molding system, comprising:
- a hot runner, including:
  - a valve stem;
  - an actuation plate; and
  - a safety connector, including:
    - a latch 140 releasably interlocking the valve stem 116 with the actuation plate 102, once the latch 140 has interlocked the valve stem 116 with the actuation plate 102, the valve stem 116 becomes movable in response to movement of the actuation plate 102; and
    - a latch mover being cooperative with the latch, and the latch mover being configured to move the latch responsive to a predetermined undesired force acting on the latch, so that so that the valve stem is released from the actuation plate.

* * * * *